May 4, 1926.
H. M. SMITH
VALVE
Filed Sept. 12, 1923
1,582,938
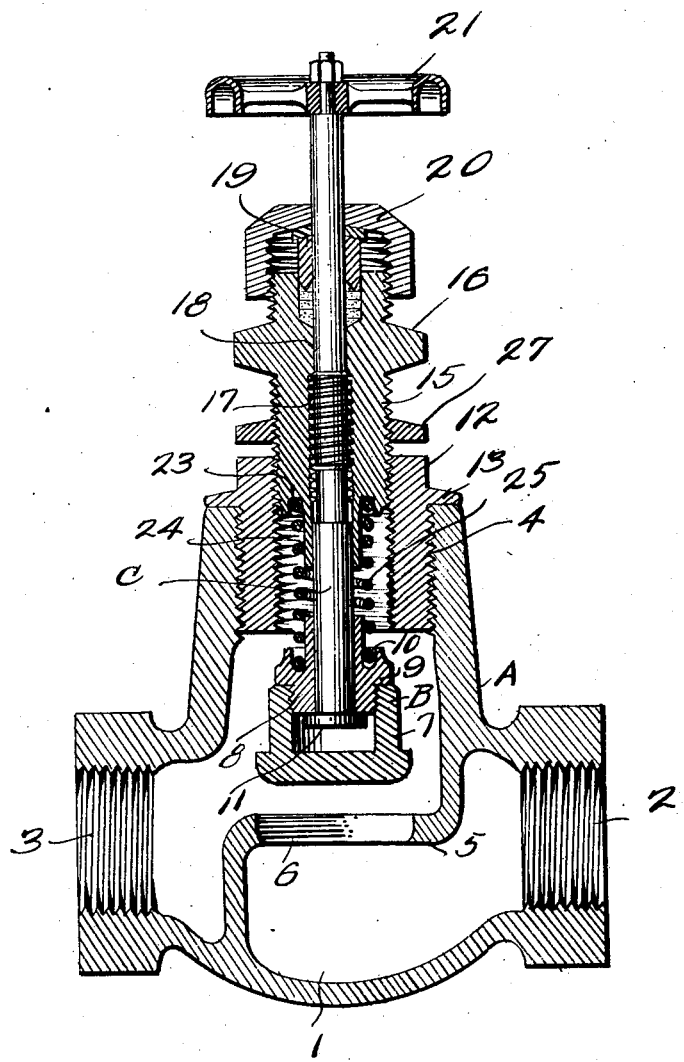
WITNESSES
Inventor
HENRY M. SMITH
By Richard B. Owen, Attorney Patented May 4, 1926.

1,582,938

UNITED STATES PATENT OFFICE.

HENRY M. SMITH, OF WILSON, NORTH CAROLINA.

VALVE.

Application filed September 12, 1923. Serial No. 662,288.

*To all whom it may concern:*

Be it known that I, HENRY M. SMITH, a citizen of the United States, residing at Wilson, in the county of Wilson and State of North Carolina, have invented certain new and useful Improvements in Valves, of which the following is a specification.

The present invention relates to a valve and has for its principal object to provide a three in one valve which will take the place of the ordinary control, check, and globe valves.

Another important object of the invention is to provide a valve of this nature including means whereby the spring for holding the valve normally on its seat may be tensioned as desired.

Another important object of the invention is to generally improve upon valves by providing a simple and efficient structure, one which is reliable in operation, readily adjustable and capable of easy operation as well as embodying a durable structure adapted for the purpose for which it is designed.

With the above and other objects in view which will appear as the description progresses, the invention resides in certain novel features of construction and arrangement of parts as will be hereinafter more fully described.

In the drawings, the figure is a vertical longitudinal section through the valve embodying my invention.

Referring to the drawing in detail it will be seen that the body or casing of the valve is indicated generally at A and includes a passage 1 having openings 2 and 3 at its ends which are preferably threaded so that they may be connected with pipes or other conduits. A threaded opening 4 is provided intermediate the ends of the passage 1 for receiving the valve and its actuating mechanism to be hereinafter described. A partition 5 is disposed in the body or casing and is provided with a valve seat 6. A valve B is associated with the seat 6 and includes a hollow body 7 provided with an open end having internal threads for receiving a sleeve 8. This sleeve 8 is constructed with an annular flange 9 having a groove 10 in its upper side. A valve stem C projects through the sleeve 8 and terminates within the body 7 of the valve B in a disk-shaped head 11 which is confined within the body of the valve by the sleeve 8. A bonnet 12 is threaded into the opening 4 of the body or casing A and is provided with an annular flange 13 adapted to rest upon the upper end of the body A. This bonnet is internally threaded for receiving a sleeve 15 provided with external threads associate with the internal threads of the bonnet 12 and a hexagonal flange or nut portion 16 is provided thereon so that a wrench may be engaged therewith. It is to be noted that this sleeve is provided with external threads above and below the flange 16. A portion of the bore of the sleeve 15 is threaded for receiving the threaded portion 17 of the stem C. The intermediate portion 18 of the bore of the sleeve 15 is restricted so as to fit closely about the stem while a portion of the stem therebelow is formed larger and thus the longitudinal movement of the stem through the sleeve is limited. A portion of the bore of the restricted portion 18 is adapted to receive suitable packing held in place by the retaining member 19 which in turn is held in place by a cap nut 20 threadedly engaged with the upper end of the sleeve 15. The stem C projects through this cap 20 and is provided at its upper end with a wheel 21 or other suitable means whereby the stem may be rotated easily. The bottom edge of the sleeve 15 is provided with an annular groove 23 and a guide extension 24 projects therebelow about the stem C. A coil spring 25 has one end seated in the groove 23 and its other end seated in the groove 10 of the sleeve 8 forming a part of the valve B and this spring normally holds the valve B on its seat 6 in the partition 5. The spring 25 may be tensioned as desired by operating the sleeve 15 as is evident and this sleeve may be locked in place by the nut 27 being screwed tightly into engagement with the upper edge of the bonnet 12. Thus the valve may be used as a check valve by screwing the stem C inwardly until the body 7 of the valve B rests upon its seat 6. If it is desired to retain the valve against displacement by pressure or the like as in the case of an ordinary control valve, the stem may be further screwed downwardly until its head 11 abuts the bottom of the body 7 of valve B. If it is desired to remove the valve from the seat, then the stem is screwed out of the sleeve and the head 11 will engage the sleeve 8 and lift the valve from its seat at the same time compressing the spring 25.

It is evident that in place of the valve which I have shown an ordinary needle valve and needle valve seat may be provided in order that the device may be used as an ammonia expansion valve or the like. Other changes in the details of construction and in the combination of parts may be resorted to without departing from the spirit of the invention or sacrificing any of its advantages.

What is claimed is:

A valve comprising a casing having a threaded opening and a valve, a bonnet threaded into the opening, a sleeve threaded into the bonnet for adjustment toward and away from the valve, a valve stem extending through and having threaded engagement with the sleeve, a packing means upon the outer end of the sleeve surrounding the valve stem, a head on the inner end of the stem, a sliding sleeve mounted upon the valve stem limited in its downward movement thereon by said head, a hollow valve head threaded upon said sliding sleeve housing the first mentioned head, the facing ends of the first mentioned sleeve and the sliding sleeve being provided with grooves, and a compressing spring coiled about the valve stem having its terminals fitted within said grooves normally holding the valve head upon its seat.

In testimony whereof I affix my signature.

HENRY M. SMITH.